United States Patent

Rehm

[19]

[11] Patent Number: 5,826,822
[45] Date of Patent: Oct. 27, 1998

[54] SYSTEM AND METHOD FOR PROVIDING CYCLIC AND COLLECTIVE PITCH CONTROL IN A ROTARY WING AIRCRAFT

[76] Inventor: Rehm N. Rehm, 11653 N. Pinehurst Cir., Mequon, Wis. 53092

[21] Appl. No.: 634,970

[22] Filed: Apr. 19, 1996

[51] Int. Cl.⁶ .................................................. B64C 27/605
[52] U.S. Cl. ........................ 244/17.25; 244/221; 416/114; 416/141; 416/168 R
[58] Field of Search ............................. 244/17.11, 17.25, 244/220, 221; 416/114, 141 R, 141 A, 134 A, 164, 168 R

[56] References Cited

U.S. PATENT DOCUMENTS

| | | |
|---|---|---|
| 2,499,314 | 2/1950 | Hunt . |
| 2,511,687 | 6/1950 | Andrews . |
| 2,630,184 | 3/1953 | Seibel ...................................... 416/114 |
| 2,731,215 | 1/1956 | Avery ................................... 244/221 X |
| 2,810,443 | 10/1957 | Doman . |
| 2,946,390 | 7/1960 | Pozgay . |
| 3,109,496 | 11/1963 | Ellis, III et al. . |
| 3,508,841 | 4/1970 | Derschmidt ............................. 416/114 |
| 3,572,616 | 3/1971 | Ulisnik . |
| 3,698,837 | 10/1972 | Marcellin . |
| 3,720,387 | 3/1973 | Foote . |
| 3,767,323 | 10/1973 | Zech . |
| 3,799,695 | 3/1974 | Yamakawa . |
| 3,841,586 | 10/1974 | Broadley et al. . |
| 3,885,887 | 5/1975 | Desjardins . |
| 3,894,703 | 7/1975 | Velasquez . |
| 3,957,227 | 5/1976 | Baskin . |
| 4,047,838 | 9/1977 | Ferris et al. . |
| 4,134,560 | 1/1979 | Messerschmidt . |
| 4,245,956 | 1/1981 | Jeffery et al. . |
| 4,432,696 | 2/1984 | Stephan et al. . |
| 4,434,956 | 3/1984 | Gonzales . |
| 4,534,524 | 8/1985 | Aldrich . |
| 4,534,704 | 8/1985 | McArdle . |
| 4,681,511 | 7/1987 | Glatfelter . |
| 4,695,227 | 9/1987 | Head et al. . |
| 4,805,850 | 2/1989 | Flux et al. . |
| 4,952,120 | 8/1990 | Aubry et al. . |
| 5,058,825 | 10/1991 | Rabouyt . |
| 5,074,494 | 12/1991 | Doolin et al. . |
| 5,083,725 | 1/1992 | Byrnes et al. . |
| 5,135,356 | 8/1992 | Shepherd . |
| 5,163,815 | 11/1992 | Fetters . |
| 5,165,853 | 11/1992 | Pancotti . |
| 5,165,854 | 11/1992 | Cicare . |
| 5,190,243 | 3/1993 | Guimbal . |

*Primary Examiner*—William Grant
*Attorney, Agent, or Firm*—Ryan, Maki, Mann & Hohenfeldt

[57] ABSTRACT

A cyclic and collective control system is provided for controlling rotor pitch in a rotary wing aircraft. The rotor blades are pivotally mounted on a hollow, spinning shaft. An angularly and vertically displaceable control shaft is mounted with the spinning shaft and carries a rotatable control hub at its end. The control hub is coupled through pitch link rods to the rotor blades. When the control shaft is displaced vertically within the spinning shaft, the rotor blade pitch is changed collectively. When the control shaft is displaced angularly relative to the spinning shaft, the rotational plane of the control hub becomes skewed relative to the rotor axis. This has the effect of changing the pitch of the rotor blades in accordance with their rotational position around the rotor axis and has the further effect of providing cyclic control.

13 Claims, 4 Drawing Sheets

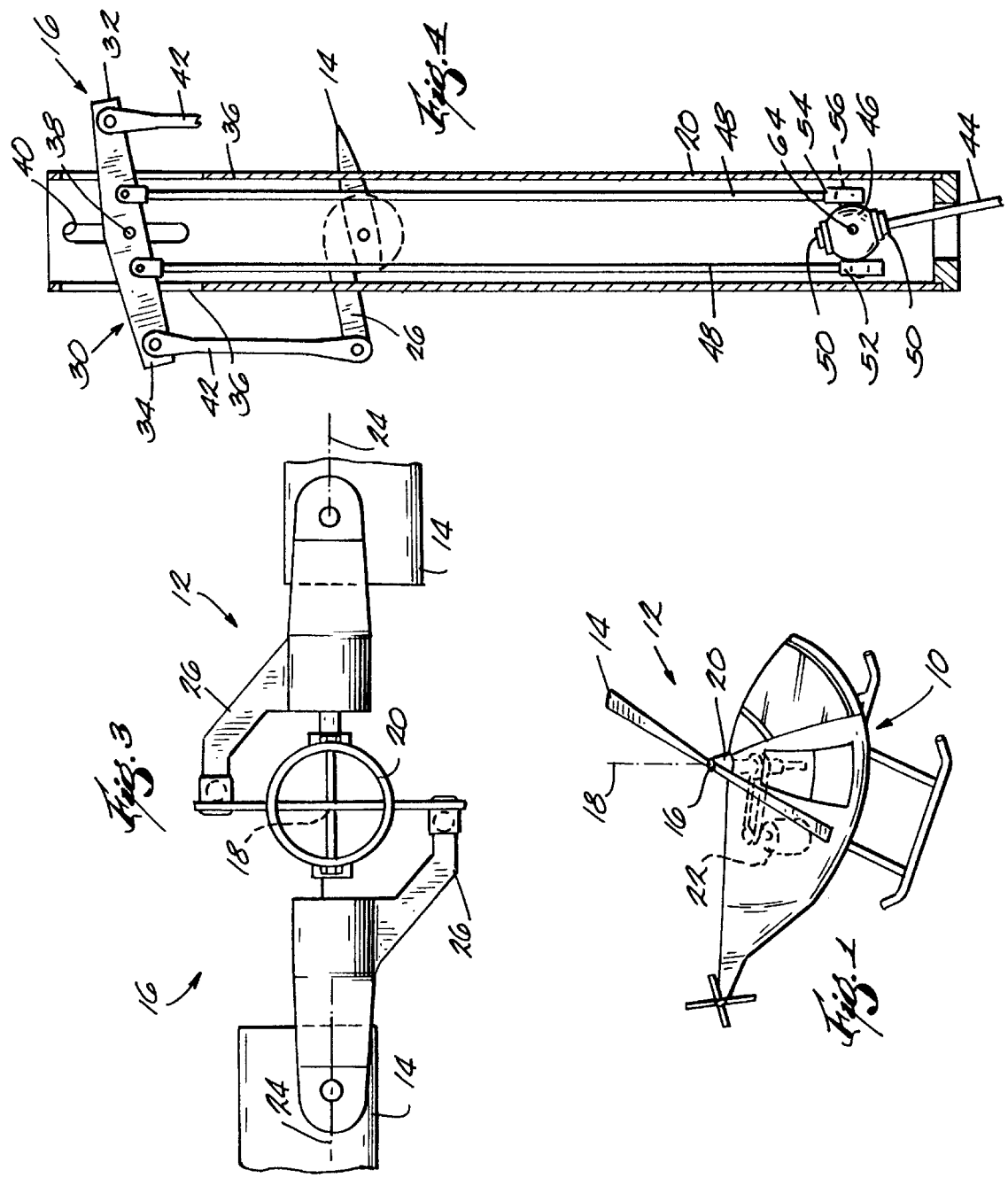

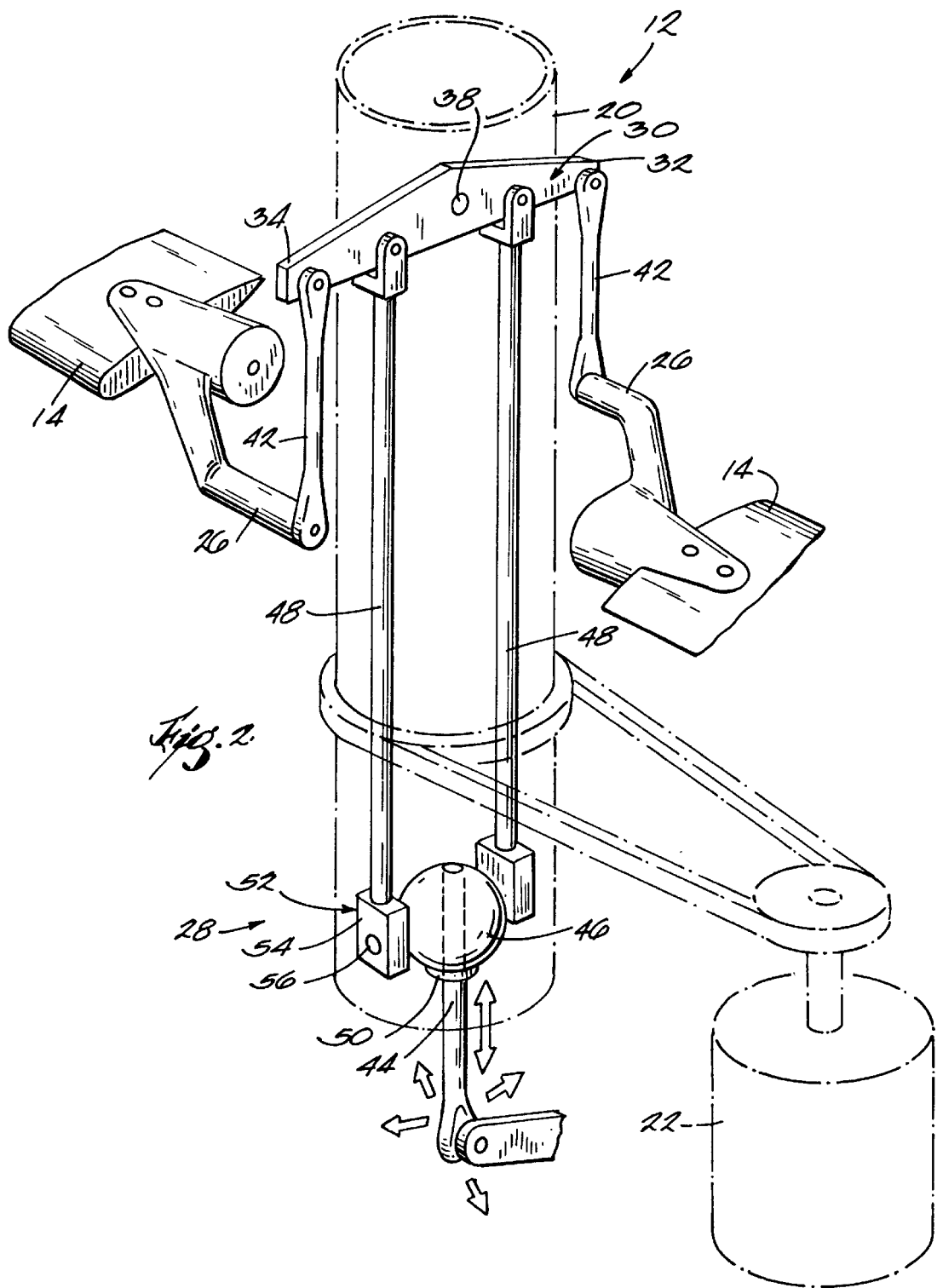

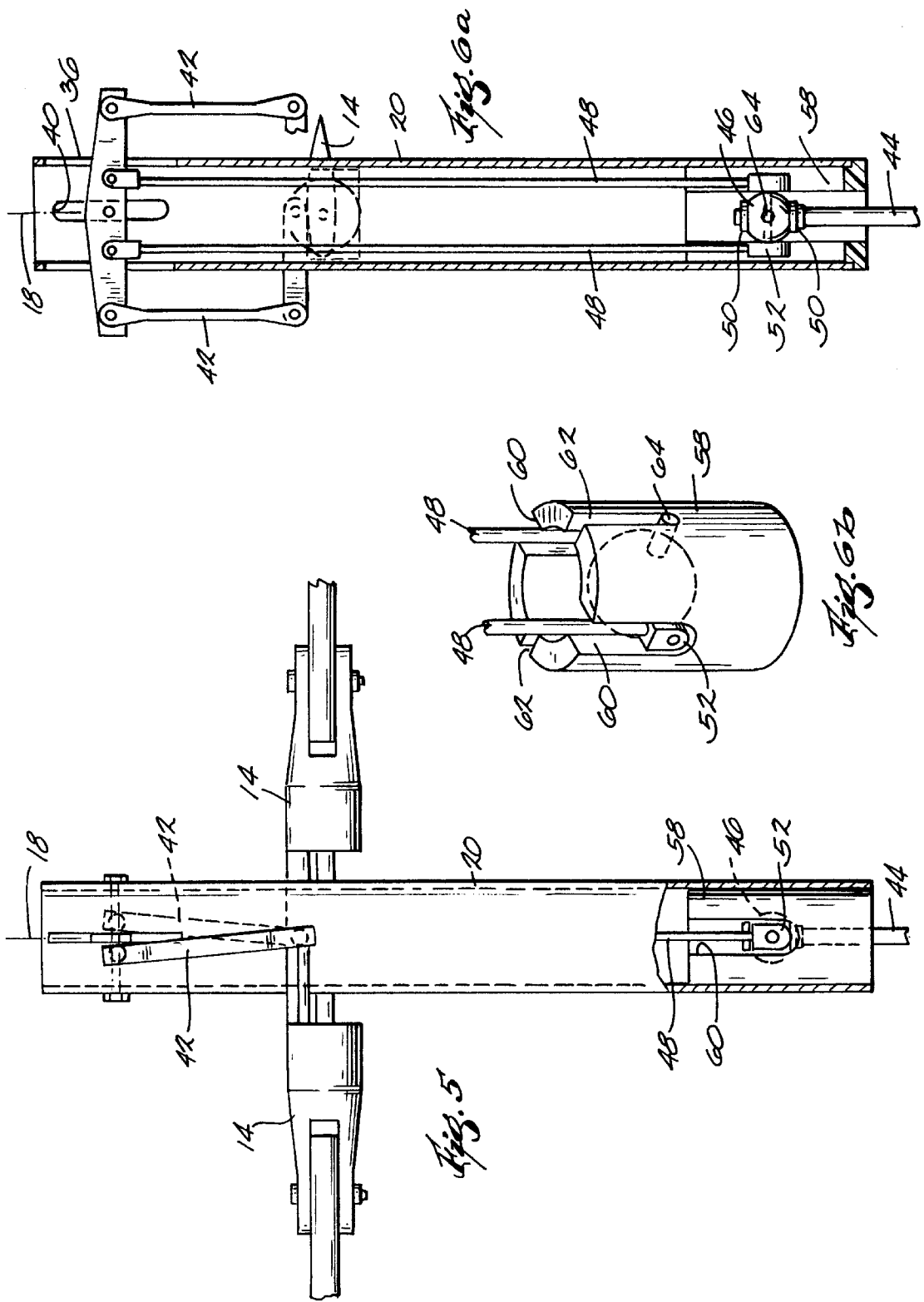

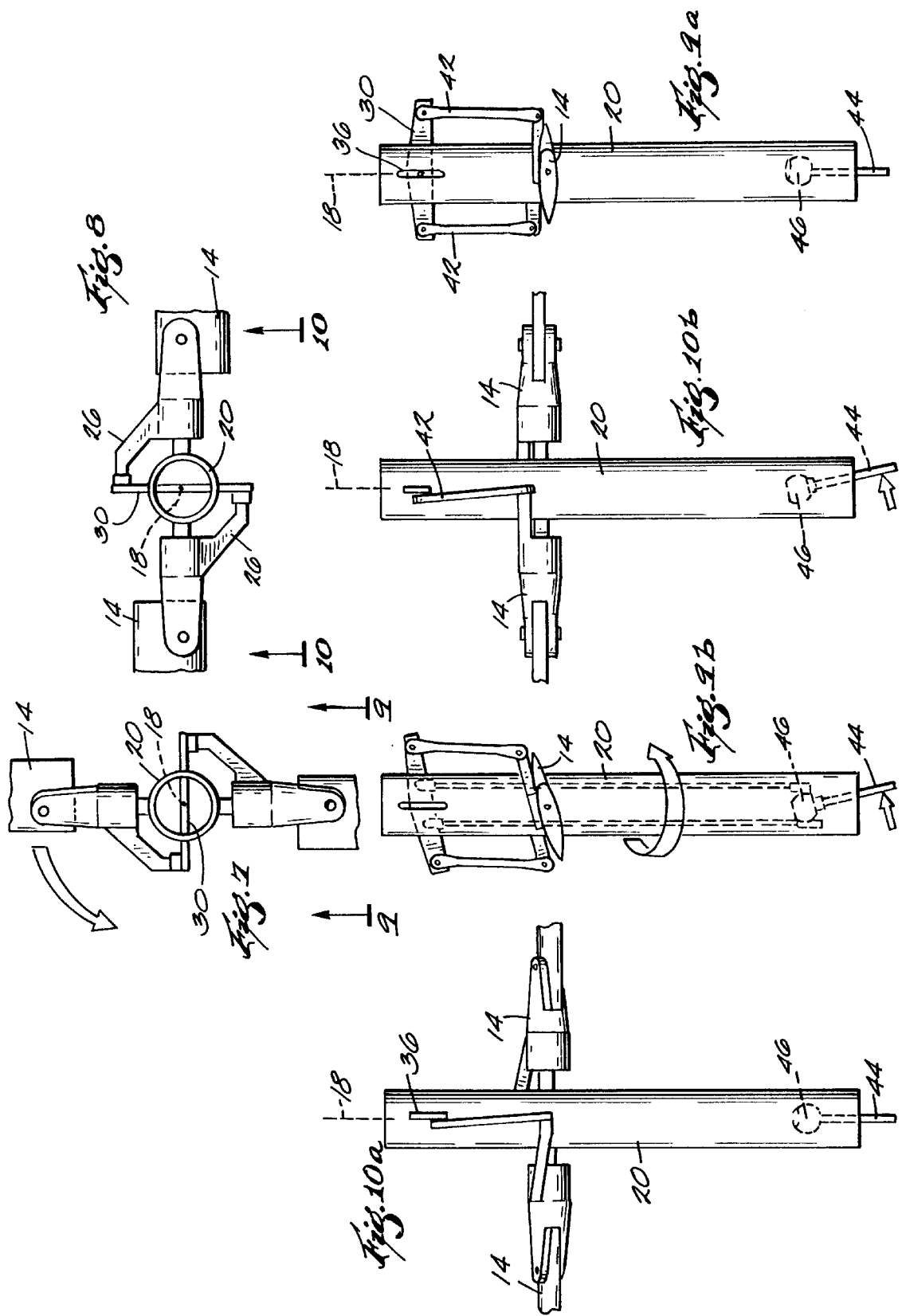

SYSTEM AND METHOD FOR PROVIDING CYCLIC AND COLLECTIVE PITCH CONTROL IN A ROTARY WING AIRCRAFT

BACKGROUND OF THE INVENTION

This invention relates generally to rotary wing aircraft such as helicopters and, more particularly, to mechanisms for controlling the pitch of rotor blades in such aircraft.

Rotary wing aircraft, commonly known as helicopters, generate lift by means of a horizontally rotatable wing or rotor having two or more rotor blades. Vertical and horizontal control over the aircraft are achieved by controlling the angle of incidence or "pitch" of the individual rotor blades as they rotate around a common center of rotation. In flight, vertical control is achieved by increasing or decreasing the pitch of all the rotor blades by the same amount and at the same time. Such control is referred to as "collective" control. Directional control is achieved by varying the pitch of the rotor blades individually depending on where each blade is in its cycle around the common center of rotation. Such control is known as "cyclic" control. Collective and cyclic control both contribute to the overall maneuverability of the aircraft.

Collective and cyclic control are most commonly achieved through use of a swashplate that encircles the rotor shaft. A plurality of vertically oriented pitch control rods are coupled at one end to the individual rotor blades and at the other end to the top half of the swashplate. As the rotor rotates, the top half of the swashplate, and the pitch control rods connected thereto, rotate around the rotationally stationary lower half of the swashplate. Collective control is achieved by raising or lowering the swashplate relative to the rotor shaft. This has the effect of changing the pitch of all the rotor blades by the same amount regardless of where the rotor blades are in their orbit around the rotor shaft. Cyclic control is achieved by canting the swashplate relative to the rotor shaft so that one side of the swashplate is high while the other side is low. This has the effect of changing the pitch of the rotor blades individually depending on where they are in their orbits around the rotor shaft so that one side of the rotor develops more lift than the other. The asymmetric lift thus developed is used to provide pitch and roll (i.e., longitudinal and lateral) control.

Although effective and reliable, swashplate-type control systems are heavy, massive and expensive. Excess weight reduces the effective payload of the aircraft and contributes to the aircraft's operating cost and overall material cost. Accordingly, a need exists for a cyclic and collective control system that provides the reliability and effectiveness of swashplate-type systems without the drawbacks of such systems.

SUMMARY OF THE INVENTION

The invention provides a cyclic control for vertically displacing the pitch link rods of a rotary wing aircraft. The cyclic control includes an angularly displaceable control shaft and a control hub having an outer peripheral portion mounted for rotation around the control shaft. The cyclic control further includes structure for angularly displacing the control shaft and structure for coupling the outer peripheral portion of the control hub to the pitch link rods.

The invention further provides a rotary wing assembly including a rotor hub mounted for rotation around a substantially vertical axis of rotation and a substantially horizontal rotor blade extending radially outwardly from the rotor hub for co-rotation therewith. The rotor blade is pivotable relative to the rotor hub around a substantially horizontal radially extending pitch axis so that rotation of the rotor blade around the pitch axis changes the pitch of the rotor blade. The rotary wing assembly further includes a pitch control rod having one end coupled to the rotor blade adjacent the hub so that vertical movement of the pitch control rod pivots the rotor blade around the pitch axis to change the pitch of the rotor blade. The rotary wing assembly further includes a control shaft displaced vertically from the rotor hub and a control hub mounted on and rotatable around the control shaft. The control hub has an outer peripheral portion connected to the remaining end of the pitch control rod and displaced radially from the control shaft. A control linkage is coupled to the control shaft and is operable to change the vertical spacing between the control shaft and the rotor hub and is further operable to change the angular orientation of the control shaft relative to the vertical axis of rotation so that collective control over the pitch of the rotor blade is provided by changing the vertical spacing between the control shaft and the rotor hub and so that cyclic control over the pitch of the rotor blade is provided by changing the angular orientation of the control shaft relative to the vertical axis of rotation.

The invention further provides a method of providing cyclic and collective pitch control in a rotary wing aircraft of the type having a plurality of rotor blades rotatable around a vertical rotary axis and having a plurality of pitch control rods coupled at one end to the rotor blades for changing the pitch of the rotor blades. The method includes the steps of locating a control hub having a peripheral portion around the vertical rotary axis at a position spaced vertically from the rotor blades, mounting the control hub for rotation around a control axis, connecting the remaining ends of the pitch control rods to the peripheral portion of the control hub so that the control hub rotates around the control axis in response to rotation of the rotor blades and the pitch control rods around the vertical rotary axis, displacing the control axis vertically along the vertical rotary axis in order to provide collective pitch control, and displacing the control axis angularly relative to the vertical rotary axis in order to provide cyclic pitch control.

It is an object of the present invention to provide a new and improved cyclic and collective control mechanism for rotary wing aircraft.

It is a further object of the present invention to provide a new and improved cyclic and collective control mechanism that is simple and economical in manufacture and durable and reliable in operation.

It is a further object of the present invention to provide a new and improved cyclic and collective control mechanism that is lightweight and compact.

It is a further object of the present invention to provide a new and improved cyclic and collective control mechanism that avoids the use of a conventional swashplate.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a helicopter having a cyclic and collective control mechanism embodying various features of the invention.

FIG. 2 is a simplified perspective view of a cyclic and collective control system embodying various features of the invention, useful in understanding the construction and operation thereof.

FIG. 3 is a fragmentary top plan view of the cyclic and collective control system shown in FIG. 2 showing rotor blades mounted for pivoting movement around a pitch axis.

FIG. 4 is a side view, in section, of the cyclic and collective control system showing the system and the rotor blades in a cyclic control condition.

FIG. 5 is a side elevation view of the cyclic and collective control system showing the system and the rotor blades in a "neutral" control condition.

FIG. 6a is a side view, in section, of the cyclic and collective control system shown in FIG. 5.

FIG. 6b is a perspective view of a bearing sleeve included in the system shown in FIG. 6a.

FIG. 7 is a fragmentary top view of the cyclic and collective control system showing the rotor blades in a twelve o'clock/six o'clock position in their rotary cycle around their center of rotation.

FIG. 8 is a top view, similar to FIG. 7, showing the rotor blades in a three o'clock/nine o'clock position in their rotary cycle around their center of rotation.

FIG. 9(a) is a cross-sectional view of the cyclic and collective control system shown in FIG. 7 taken along line 9—9 thereof showing the rotor blade pitch combination that results when the rotor blades are in the position shown and the control shaft is in the "neutral" position as shown.

FIG. 9(b) is a cross-sectional view, similar to FIG. 9(a), showing the rotor blade pitch combination that results when the rotor blades are in the position shown and the control shaft is angularly displaced from the "neutral" position as shown.

FIG. 10(a) is a cross-sectional view of the cyclic and collective control system shown in FIG. 8 taken along line 10—10 thereof showing the rotor blade pitch combination that results when the rotor blades are in the position shown and the control shaft is in the "neutral" position as shown in FIG. 9(a).

FIG. 10(b) is a cross-sectional view, similar to FIG. 9(b), showing the rotor blade pitch combination that results when the rotor blades are in the position shown and the control shaft is angularly displaced from the "neutral" position as shown in FIG. 9(b).

DESCRIPTION OF THE PREFERRED EMBODIMENT

The invention provides a new and improved cyclic and collective control system for rotary wing aircraft such as the helicopter shown at 10 in FIG. 1. The helicopter 10 includes a rotary wing assembly 12 that in the illustrated embodiment includes a pair of rotor blades 14. The rotor blades 14 extend radially outwardly from a rotor hub 16 that, in turn, is rotated around a substantially vertical axis of rotation 18 by means of a hollow spinning shaft 20. The shaft 20, in turn, is rotated in known manner by means of a conventional aircraft engine 22 that is coupled to the shaft 20 through a suitable linkage.

Referring further to FIGS. 2–6, the rotor blades 14 are each pivotable relative to the rotor hub 16 around a substantially horizontal, radially extending pitch axis 24 (FIG. 3). Pivoting movement of a rotor blade 14 around the pitch axis 24 changes the pitch of the rotor blade 14, and, hence, the lift generated by that rotor blade 14. In the illustrated embodiment each rotor blade 14 includes an offset control arm 26 that can be moved up or down to change the pitch of the rotor blade 14.

Vertical control, as well as pitch and roll control, over the helicopter 10 is achieved by controllably changing the pitch of the rotor blades 14 in both a cyclic and collective manner. To this end, the helicopter includes a cyclic and collective control system 28 that is constructed in accordance with, and embodies various features of, the invention. As best seen in FIGS. 2 and 4, the control system 28 includes a bell crank 30 that is vertically displaced from the rotor blades 14 and is pivotable relative to the shaft 20. Preferably, the bell crank 30 is positioned above the rotor blades 14 as shown, although it will be appreciated that the bell crank 30 could also be positioned below the rotor blades 14. The bell crank 30 extends diametrically through the shaft 20, and the ends 32 and 34 of the bell crank 30 project beyond the shaft 20 through elongate slots 36 formed in the shaft 20. The bell crank 30 is pivotally mounted relative to the shaft 20 by means of a pivot pin 38 that extends through the bell crank 30 and through a pair of diametrically opposed, vertically extending slots 40 in the shaft 20. Pivoting movement of the bell crank 30 around the pivot pin 38 causes one end of the bell crank 30 to move up while the other end moves down and vice versa. Additionally, the slots 40 permit the entire bell crank 30 to move up or down relative to the shaft 20 without changing the rotational position of the bell crank 30 around the pivot pin 38. By so mounting (and moving) the bell crank 30, the ends 32 and 34 of the bell crank 30 can be made to move up together, to move down together or to move in opposite directions relative to each other.

As further illustrated, the ends 32 and 34 of the bell crank 30 are coupled to the control arms 26 of the rotor blades 14 by means of pitch control rods 42. Each pitch control rod 42 comprises a rigid, elongate link that is pivotally coupled at one end to one of the control arms 26 and at the other end to one of the bell crank ends 32 or 34. The effect is to translate vertical movement of the bell crank ends 32 and 34, from whatever cause, (i.e., pivoting movement of the bell crank 30 around the pivot pin 38 or overall vertical movement of the bell crank 30 relative to the shaft 20 along the slots 40) into corresponding changes in rotor blade pitch.

The bell crank 30, the pitch control rods 42 and the rotor blades 14 all co-rotate with the shaft 20. Collective pitch control is achieved by moving the entire bell crank 30 up or down relative to the rotating shaft 30. Cyclic control is achieved by pivoting the bell crank 30 around the pivot pin 38 at various points in the rotary cycle of the shaft 20 around the axis of rotation 18 so that the instantaneous pitch of each rotor blade 14 changes depending on where the rotor blade 14 is in its orbit around the axis of rotation 18. To achieve these ends, the control system 28 further includes a control rod or shaft 44, a control hub 46 mounted on the control shaft 44 and a pair of pitch link rods 48 that ultimately couple the control hub 46 with the individual rotor blades 14. (In the illustrated embodiment such coupling is achieved through the bell crank 30, the pitch control rods 42 and the control arms 26. It will be appreciated, however, that in its broader aspects, the invention can also be implemented using other forms of coupling, such as direct coupling of the pitch link rods 48 to the rotor blades 14 or control arms 26.)

In the illustrated embodiment the control shaft 44 comprises an elongate, rigid, cylindrical shaft. The control hub 46 comprises a generally spherical member mounted for rotation around the upper end of the control shaft 44. As illustrated, the upper end of the control shaft 44 extends diametrically through the control hub 46. Bearing supports 50 or similar structure on the control shaft 44 support the control hub 46 and keep it from sliding up or down along the control shaft 44. The lower end of the control shaft 44 projects below the lower end of the spinning shaft 20. The lower ends of the command rods 48 are connected to the control hub 46 substantially along the outer equatorial periphery thereof. The control shaft 44 is angularly displaceable relative to the axis of rotation 18 of the spinning shaft 20 but does not rotate with the shaft 20. The control hub 46, which is rotatably mounted on the control shaft 44, is free to rotate with the shaft 20 as are the pitch link rods 48 connected to the control hub 46.

In accordance with one aspect of the invention, the control shaft 44 is mounted for vertical as well as angular displacement relative to the spinning shaft 20. It will be understood that when the control shaft 44 is moved upwardly relative to the spinning shaft 20, the control hub 46 also moves up, as do the pitch link rods 48. Such upward movement of the pitch link rods 48 pushes the bell crank 30 up relative to the shaft 20 with the further effect of increasing the pitch of the rotor blades 14 collectively. Similarly, downward movement of the control shaft 44 reduces the pitch of the rotor blades 14 collectively Accordingly, collective pitch control is achieved by moving the control shaft 44 either upwardly or downwardly relative to the spinning shaft 20.

Cyclic control of the rotor blade pitch is achieved by changing the angular orientation of the control shaft 44 relative to the axis of rotation 18. As best seen in FIGS. 5 and 6, when the control shaft 44 is axially or collinearly aligned with the axis of rotation 18, the equatorial plane of the control hub 46 is perpendicular to the axis of rotation 18. Accordingly, the relative vertical position of each pitch link rod 48 with respect to the shaft 20 remains the same regardless of where the shaft 20 is in its rotation around the axis 18. Similarly, the pitch of each rotor blade 14 is uninfluenced by the rotational position of the spinning shaft 20 and is determined solely by the vertical position of the control shaft 44 and the control hub 46 relative to the shaft 20. Thus, coaxial or collinear alignment of the control shaft 44 with the main rotor axis of rotation 18 represents a "neutral" position as far as cyclic control is concerned. When the control shaft is in this "neutral" position, each rotor blade 14 will have the same pitch throughout its orbit around the rotational axis 18 determined solely by the vertical position of the control shaft 44 relative to the spinning shaft 20.

When the control shaft 44 is displaced angularly from the "neutral" position and is no longer coaxially or collinearly aligned with the axis of rotation 18, the equatorial plane of the control hub 46 no longer remains perpendicularly oriented relative to the axis of rotation 18 as it does when the control shaft 44 is in the "neutral" position. Because the equatorial plane of the control hub 46 is now skewed relative to the axis of rotation 18, each of the pitch link rods 48 undergoes an up and down translation relative to the shaft 20 with each rotation of the control hub 46 around the control shaft 44. Such up and down translation of the pitch link rods 48 causes the pitch of each rotor blade 14 to change depending on where it is in its cycle around the axis 18. How much the pitch changes depends on how far the control shaft 44 is displaced from the "neutral" position. Similarly, where the points of maximum and minimum pitch occur in each rotational cycle depends on the direction in which the control shaft 44 is angularly displaced. Thus, cyclic control can be achieved independently of collective control by simultaneously controlling the degree and direction of the angular displacement of the control shaft 44 relative to the main rotor axis of rotation 18.

The operation of the cyclic control can best be understood by reference to FIGS. 7–10(b). FIG. 7 shows the rotor blades 14 in a twelve o'clock/six o'clock orientation, while FIG. 8 shows the rotor blades 14 after they have rotated 90° in a counter clockwise direction to a nine o'clock/ three o'clock orientation. In FIGS. 9(a) and 10(a) the control shaft 44 remains in a "neutral" (i.e., non-angularly displaced) position, while in FIGS. 9(b) and 10(b) the control shaft 44 is angularly displaced from the "neutral" position. It will be seen that, when the control shaft 44 remains in the "neutral" position (FIGS. 9(a) and 10(a)), the pitch of the rotor blades 14 remains constant regardless of the rotational position of the blades around the axis 18. When the control shaft 44 is angularly displaced from the "neutral" position (i.e., FIGS. 9(b) and 10(b)), the blades 14 are of substantially equal pitch when they are at one position in their rotational cycle around the axis 18 (i.e., FIG. 9(b)) but pivot smoothly to become of substantially unequal pitch when they rotate an additional 90° around the axis 18 (i.e., FIG. 10(b)). The resulting unequal pitch creates asymmetric lift that can be used to control the pitch and roll of the helicopter 10. The amount and position of the asymmetric lift thus created is controlled by the direction and amount by which the control shaft 44 is angularly displaced from the rotational axis 18.

The construction details of the control system 28 should be in accordance with sound aeronautical engineering practices. The spinning shaft 20 should be configured to transfer torque from the engine 22 to the rotor blades 14. In this regard, the bell crank 30 is preferably located above the rotor blades 14 so that the slots 36 and 40 are not formed in the torque transferring section of the shaft 20. The shaft 20 should be supported for rotation by means of suitable bearings in accordance with known practice so that its only permissible movement is rotation around its own axis. Preferably, the pitch link rods 48 are connected to the control hub 46 by means of universal rod end bearings 52 to allow freedom of movement in all angular directions and a suitable means of attachment for the applied forces. Preferably, the housing 54 of each rod end bearing 52 is rigidly attached to the pitch link rod 48, and the bearing member 56 is rigidly attached to the control hub 46. In the illustrated embodiment, the pitch link rods 48 are connected to the outer surface of the control hub 46. It will be appreciated that, given a sufficiently large control hub 46, the pitch link rods 48 could also be fitted to the inside of the control hub 46 if space permits.

Preferably, a bearing sleeve 58 (FIGS. 6a and 6b) is fitted to the lower end of the shaft 20 and supports the control shaft 44 and the control hub 46 for axial and angular movement relative to the shaft 20. The sleeve 58 is bolted to the side of the shaft 20 and includes two opposed, elongate slots 60 that receive and provide clearance for the rod end bearings 52. Two additional slots 62, located between the slots 60, receive a pair of diametrically opposed pins 64 extending outwardly from the control hub 46 between the rod end bearings 52. The slots 62 and pins 64 prevent the control hub 46 from rotating relative to the shaft 20 so that the rod end bearings 52 and the pitch link rods 48 connected thereto, are constrained to rotate with the spinning shaft 20 and around the control shaft 44. The elongate slots 60,62 nevertheless permit the control shaft 44, control hub 46 and pitch link rods 48 to move up and down relative to the shaft 20 to provide collective control.

The cyclic and collective control system herein shown and described offers many advantages over prior systems. The system can be implemented with relatively few, easily and economically manufactured parts. In addition to improving manufacturing economy, this improves reliability by reducing the number of possible failure modes. By eliminating the massive swashplate, a lighter weight system becomes possible. The system also makes it possible to locate the pitch link rods within the spinning shaft rather than externally to it, thereby reducing aerodynamic drag and reducing the in-flight accident potential. Finally, the system permits the use of a larger hollow spinning shaft that is more efficient and stiffer for its weight than smaller diameter shafts.

It will be appreciated that, although the system and method have been shown and described in the context of a helicopter, the system and method are applicable to all forms of rotary wing aircraft such as propeller-driven aircraft, aerobatic aircraft, vertical take-off and landing aircraft and other aircraft emolying various forms of rotary wing structures. Similarly, the system and method are usable with rotary wings having more than the two blades illustrated herein as well as with single bladed systems employing a counterweight for counterbalancing a single rotor blade.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A cyclic control for a rotary wing aircraft having rotor blades and pitch link rods coupled to the rotor blades, the cyclic control being operative to vertically displace the pitch link rods of the rotary wing aircraft, said cyclic control comprising:

an angularly displaceable control shaft;

a control hub comprising a substantially spherical member having an outer peripheral portion mounted for rotation around the control shaft, the control shaft extending substantially diametrically through said spherical member;

means for angularly displacing the control shaft; and, means for coupling the outer peripheral portion of the control hub to the pitch link rods.

2. A cyclic control as defined in claim 1 wherein said control shaft is vertically displaceable.

3. A cyclic control as defined in claim 1 wherein said means for coupling comprises a universal bearing engaging said outer peripheral portion of said control hub.

4. A rotary wing assembly comprising:

a rotor hub mounted for rotation around a substantially vertical axis of rotation;

a substantially horizontal rotor blade extending radially outwardly from said rotor hub for co-rotation therewith, said rotor blade being pivotable relative to said rotor hub around a substantially horizontal radially extending pitch axis so that rotation of said rotor blade around said pitch axis changes the pitch of said rotor blade;

a pitch control rod having one end coupled to said rotor blade adjacent said hub so that vertical movement of said pitch control rod pivots said rotor blade around said pitch axis to change the pitch of said rotor blade;

an elongate control shaft displaced vertically from said rotor hub disposed substantially along said axis of rotation and angularly displaceable relative to said axis of rotation;

a control hub comprising a substantially spherical member mounted on and rotatable around said control shaft, the control shaft extending substantially diametrically through said spherical member, said control hub having an outer peripheral portion connected to the remaining end of said pitch control rod and displaced radially from said control shaft; and a control linkage coupled to said control shaft, said control linkage being operable to change the vertical spacing between said control shaft and said rotor hub and being further operable to change the angular orientation of said control shaft relative to said vertical axis of rotation so that collective control over the pitch of said rotor blade is provided by changing said vertical spacing between said control shaft and said rotor hub and so that cyclic control over the pitch of said rotor blade is provided by changing the angular orientation of said control shaft relative to said vertical axis of rotation.

5. A rotary wing assembly as defined in claim 4 wherein said control linkage includes a control interface for receiving control inputs generated by the pilot of a rotary wing aircraft.

6. A rotary wing assembly as defined in claim 6 wherein said control shaft and said control hub are positioned below said rotor hub.

7. A rotary wing assembly as defined in claim 4 wherein said rotary wing assembly includes a plurality of said rotor blades and a like plurality of said pitch control rods.

8. A rotary wing assembly as defined in claim 7 wherein each of said pitch control rods is connected to a different point on said outer peripheral portion of said control hub.

9. A method of providing cyclic and collective pitch control in a rotary wing aircraft having a plurality of rotor blades rotatable around a vertical rotary axis and having a plurality of pitch control rods coupled at one end to the rotor blades for changing the pitch of the rotor blades, said method comprising the steps of:

providing a control hub comprising a substantially spherical member having a peripheral portion; locating the control hub with the peripheral portion around the vertical rotary axis at a position spaced vertically from the rotor blades;

mounting the control hub for rotation around a control axis extending substantially diametrically through said spherical member;

connecting the remaining ends of the pitch control rods to the peripheral portion of the control hub so that said control hub rotates around the control axis in response to rotation of the rotor blades and the pitch control rods around the vertical rotary axis;

displacing the control axis vertically along the vertical rotary axis in order to provide collective pitch control; and displacing the control axis angularly relative to the vertical rotary axis in order to provide cyclic pitch control.

10. A method as defined in claim 9 wherein the control hub is mounted below the rotor blades.

11. A method as defined in claim 9 wherein the control axis is defined by means of an elongate shaft and said step of mounting the control hub comprises the step of engaging said elongate shaft with a bearing mounted on the control hub.

12. A method as defined in claim 9 wherein the step of displacing the control axis vertically is achieved through manipulation of a control interface by the pilot of the rotary wing aircraft.

13. A method as defined in claim 12 wherein the step of displacing the control axis angularly is achieved through manipulation of a control interface by the pilot of the rotary wing aircraft.

* * * * *